United States Patent
Swain et al.

(10) Patent No.: US 6,393,908 B1
(45) Date of Patent: May 28, 2002

(54) OUTFLOW METER

(76) Inventors: Daniel A. Swain, P.O. Box 205, Ruston, LA (US) 71273; Jon M. Swain, P.O. Box 1606, Ruston, LA (US) 71270

( * ) Notice: Subject to any disclaimer, the term of this patent is extended or adjusted under 35 U.S.C. 154(b) by 0 days.

(21) Appl. No.: 09/520,750

(22) Filed: Mar. 7, 2000

(51) Int. Cl.[7] .................................................. G01F 3/24
(52) U.S. Cl. ............................ 73/216; 73/223; 73/224
(58) Field of Search ........................... 73/38, 223, 224, 73/216

(56) References Cited

U.S. PATENT DOCUMENTS

| | | | |
|---|---|---|---|
| 3,898,124 A | * 8/1975 | Oslon | 162/238 |
| 3,909,596 A | * 9/1975 | Sullivan | 73/196 |
| 4,070,903 A | * 1/1978 | Lees et al. | 73/38 |
| 4,164,139 A | 8/1979 | Jones | 73/38 |
| 4,341,110 A | 7/1982 | Bloch | 73/38 |
| 5,079,950 A | 1/1992 | McKiernan | 73/313 |
| 5,747,083 A | * 5/1998 | Raymond et al. | 426/117 |
| 5,780,720 A | 7/1998 | Swain | 73/38 |

OTHER PUBLICATIONS

Outflow Meter Manual, Engineering Services Div. of Fed. Hwy. Admin. Sep., 1978.

* cited by examiner

Primary Examiner—Max Noori
(74) Attorney, Agent, or Firm—John M. Harrison

(57) ABSTRACT

A self-contained symmetrical outflow meter for resting on a non-skid surface such as pavement and timing the rate of water drainage from the surface. The outflow meter is characterized by a circular base, a pair of handle supports which extend upwardly from the base and a handle which spans the top end portions of the handle supports. A funnel is mounted between the handle supports beneath the handle and a vertical water discharge tube for containing water is mounted in the base, beneath the funnel. A spring-loaded plunger is mounted in the discharge tube for selectively sealing a water discharge opening provided in the base. Upper and lower adaptors are suspended from the funnel inside the water discharge tube, and upper and lower switch floats are vertically displaceably mounted on the respective upper and lower adaptors. A timer is provided on a timer support which spans the upper ends of the handle supports, and is wired to the switch floats. The base is placed on the pavement surface with the plunger sealing the water discharge opening, and water is poured into the water discharge tube. As the water level exceeds the levels of the respective switch floats, the floats are displaced upwardly on the respective adaptors. The plunger is then released, allowing the water to flow from the water discharge tube through the discharge opening onto the pavement under a sealing ring on the bottom surface of the base. The floats are sequentially displaced by gravity and the timer indicates the elapsed time of water flow between the float switches and from the water discharge tube, thus indicating the rate of water drainage from the pavement.

20 Claims, 4 Drawing Sheets

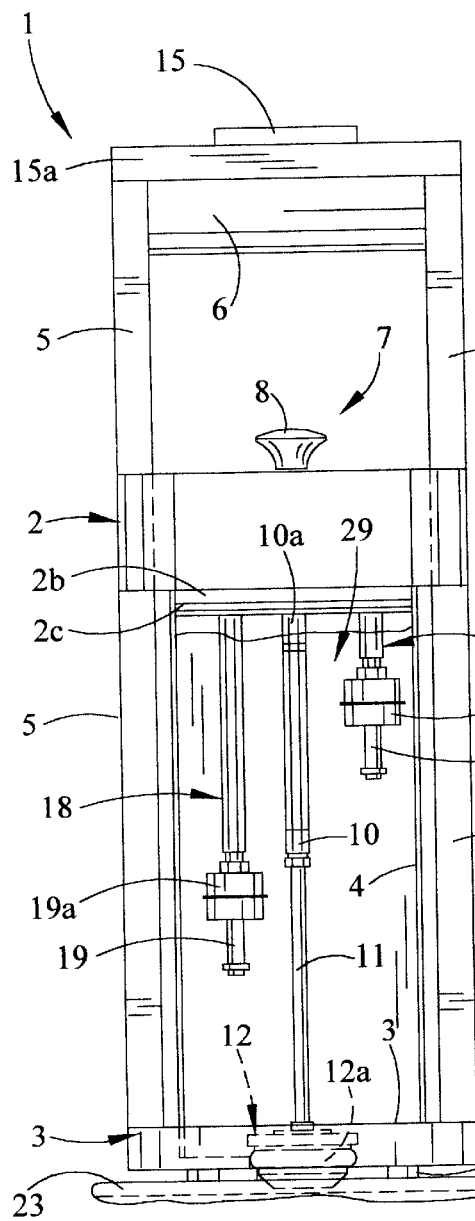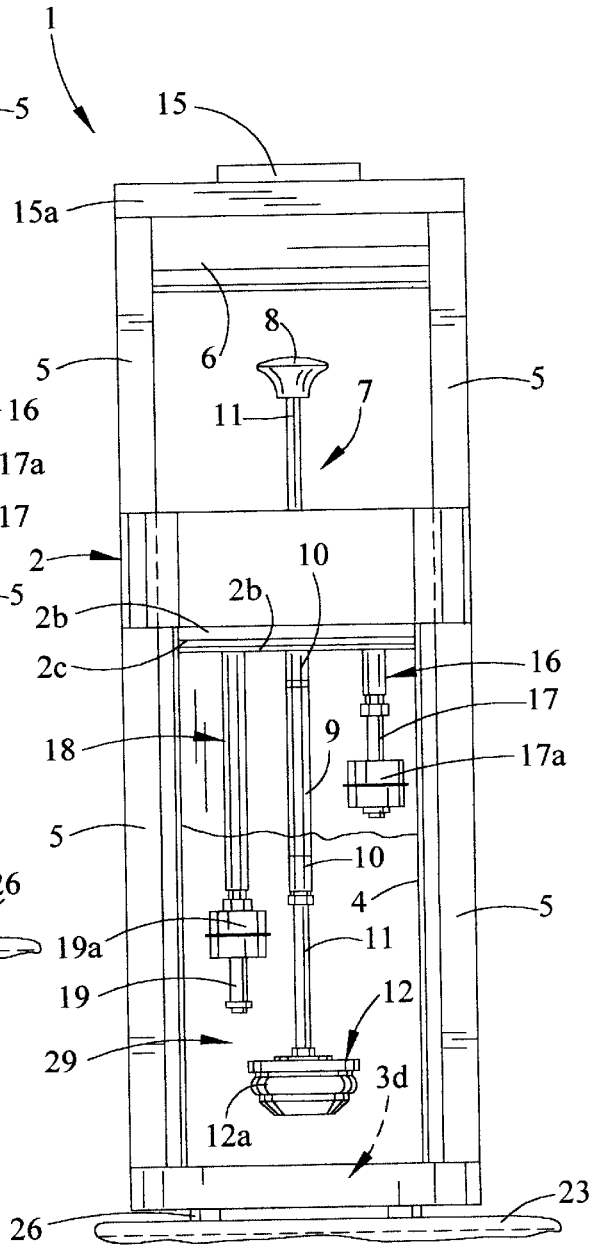
FIG. 6
FIG. 7

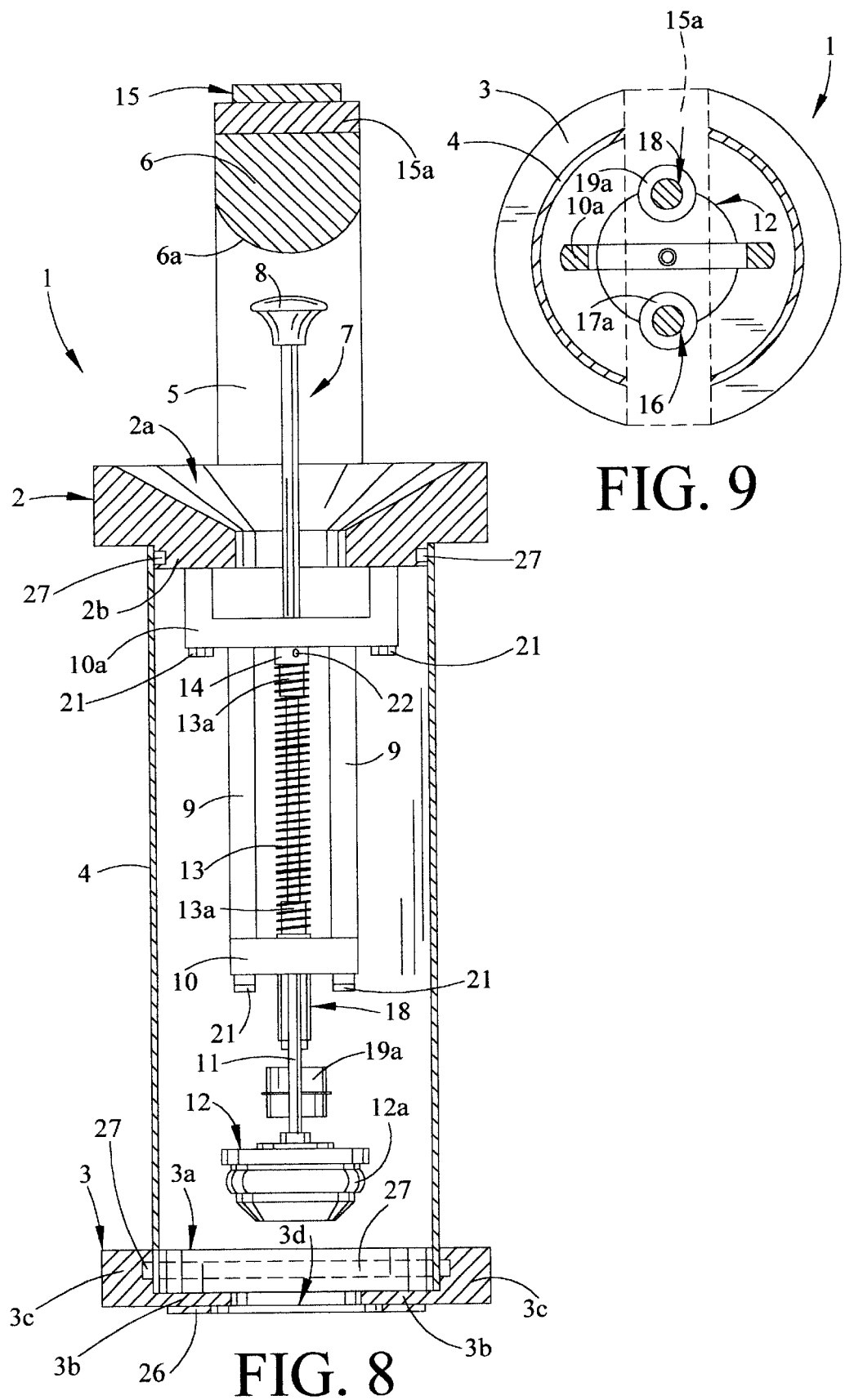

OUTFLOW METER

BACKGROUND OF THE INVENTION

1. Field of the Invention

This invention relates to devices for measuring the water drainage characteristics of selected non-skid surfaces, including open-grated surfaces and more particularly, to a self-contained symmetrical outflow meter for resting on the surface and timing the water drainage through the texture voids. In a preferred embodiment the outflow meter is characterized by an elongated, cylindrical, vertically-oriented water discharge tube for containing water. The water discharge tube is mounted in a circular base having a pair of handle supports which extend upwardly from the base on respective sides of the water discharge tube, in substantially diametrically-spaced relationship with respect to each other. A handle spans the upper end portions of the handle supports and a circular funnel is mounted between the handle supports, beneath the handle and above the water discharge tube. A spring-loaded plunger is slidably suspended from the funnel, into the water discharge tube for selectively sealing a water discharge opening provided in the base. Upper and lower adaptors of different lengths, wired to a timer typically provided on a timer support spanning the handle supports, are suspended from the funnel inside the water discharge tube, and upper and lower switch floats are vertically displaceably mounted on the respective upper and lower adaptors. In application, the base is placed on the pavement or other surface to be tested and the plunger is operated to seal the water discharge opening. Water is then poured into the water discharge tube through the funnel, to a level which exceeds the level of the upper switch float. When the water is at this level, both the upper and lower switch floats are in the raised or top position on the respective adaptors and this prevents the timer from operating. The timer is reset to "zero" and the plunger is released to unseal the discharge opening, thus allowing the water to flow from the water discharge tube through the discharge opening onto the surface to a sealing ring on the bottom surface of the base to search for texture voids in the test surface. As water flows from the water discharge tube through the discharge opening onto the surface and leaks through the texture voids under pressure of gravity, the water level in the water discharge tube falls below the upper switch float, which is displaced downwardly by gravity on the upper adaptor, while the lower switch float remains in the upper position on the lower adaptor. This causes the electronic timer to begin counting. As the water level continues to fall below the level of the lower switch float, the lower switch float is likewise downwardly displaced by gravity on the lower adaptor, and this causes the timer to stop counting. The time required for the water level in the tube to fall from the level of the upper switch float to the level of the lower switch float is indicated on the timer and indicates the rate of water drainage of the pavement surface upon which the outflow meter is placed.

2. Description of the Prior Art

A typical conventional outflow meter is characterized by a vertical water discharge tube having a base and a base seal for resting on a surface such as pavement, a cap mounted on the tube top and a plunger suspended from the cap for reversibly sealing a water discharge opening provided in the base. A pair of brass probes is typically suspended from the cap into the tube at different levels. Each probe is provided with a jack included on the cap, and a pair of cables, wired to an electronic timer and circuit board, are inserted in the jack. The base seal of the outflow meter is placed on the pavement or other surface and the tube is filled with water to a level exceeding the bottom end of the top brass probe, immersion of which prevents timer activation. After the discharge opening is unsealed and the water level in the tube drops below the level of the upper brass probe, the timer is activated. As the water level drops below the lower probe, the timer is stopped and the time required for the water level to drop from the upper probe to the lower probe, displayed on the timer, reveals the drainage characteristics of the pavement surface. However, this type of outflow meter is cumbersome to use, since care must be exercised to prevent the water from the tube from contacting the cable pins and jacks on the tube top, in order to prevent an electrical short and accompanying erroneous readings on the timer. The new and improved, self-contained outflow meter of this invention utilizes a pair of upper and lower adaptors having switch floats which are provided on the adaptors, respectively, in place of the brass probes of the conventional outflow meter. Because the upper and lower adaptors of the outflow meter are wired directly to the electronic timer through a sealed and waterproof corridor, the need for a cable trailing from the adaptors to the electronic timer and circuit board is eliminated, also eliminating the need for exercising special care in preventing water in the tube from contacting the cable pins and jacks. Another outflow meter for measuring surface drainage characteristics of pavement is detailed in U.S. Pat. No. 4,070,903, dated Jan. 31, 1978, to Geoffrey Lees, et al, entitled "Outflow Meter for Measuring Surface Drainage Characteristics". The outflow meter is characterized by a disk having a surface-engaging face which is disposed in contact with the surface being measured, an orifice extending through the disk and terminating at the surface-engaging face, a mechanism for pressing the disk into engagement with the surface under a predetermined load and a mechanism for supplying a predetermined volume of fluid through the orifice to the surface-engaging face. My U.S. Pat. No. 5,780,720, dated Jul. 14, 1998, describes an "Outflow Meter" for resting on pavement and measuring the rate of water drainage from the pavement. The outflow meter includes a vertical tube for containing water and having a bottom water discharge end sealed by a rubber sealing ring. A spring-loaded plunger is suspended from a cap mounted on the upper end of the tube for selectively sealing a water discharge opening provided in the base. Upper and lower float switches are suspended from the cap into the tube and include upper and lower switch floats, respectively, which are vertically displaceably mounted. A timer is provided on the cap and is wired to the float switches. The base is placed on the surface with the plunger sealing the water discharge opening and the water is poured into the tube. As the water level exceeds the respective levels of the switch floats, the floats are displaced upwardly. The plunger is then released, allowing the water to flow from the tube through the discharge opening onto the surface and under the sealing ring on the base. The floats are sequentially displaced by gravity and the timer records the elapsed time of water flow between the float switches and from the tube, thus indicating the rate of water drainage from the surface.

One of the problems associated with the outflow meter described in my U.S. Pat. No. 5,780,720, is the relative instability of the outflow meter on a pavement surface due to the unequal weight distribution and lack of symmetry inherent in the design of the outflow meter, insofar as the handle and timer of the meter are both mounted on the same side of the meter. Moreover, the funnel of the meter, used for pouring the water into the meter, is too small, thus rendering it difficult to pour water into the water discharge tube, and water can be poured into the tube from only one side of the meter. Furthermore, the tapered rubber plunger head of the meter has a tendency to inadvertently slip out of the water discharge opening before or during pouring of water into the water discharge tube, and this causes premature release of water from the water discharge opening at the bottom of the tube. In contrast, the handle and timer of my new and improved outflow meter are mounted in the center of the meter, at the top thereof such that the center of gravity of the meter is substantially at the center, rather than oft center, of the meter, thus rendering the meter more stable on pavement surfaces. The circular funnel of the outflow meter of this invention extends 360 degrees around the meter, such that water can be poured into the water discharge tube from either side of the meter. Finally, the plunger head of the outflow meter of this invention is fitted with a TEFLON (trademark)-coated neoprene ring which snugly fits into the water discharge opening of the meter, thus substantially preventing inadvertent slipping of the plunger head from the water discharge opening.

An object of this invention is to provide a new and improved, self-contained and compact outflow meter for measuring the water drainage rate on a pavement or other surface having a given texture.

Another object of this invention is to provided a new and improved outflow meter for measuring the water drainage characteristics of pavement, which outflow meter is characterized by portability, reliability, low maintenance, easy use and stability on a pavement surface.

Still another object of this invention is to provide a new and improved outflow meter for measuring surface drainage characteristics, which outflow meter is characterized by a circular base; a sealing ring provided on the bottom surface of the base for resting on a pavement or other surface; a pair of handle supports extending upwardly from the base, in substantially diametrically-spaced relationship to each other; a timer support spanning the upper ends of the handle supports; a handle spanning the handle supports beneath the timer support; a circular funnel mounted between the handle supports, beneath the handle; an elongated, vertical water discharge tube for momentarily holding a selected volume of water, mounted beneath the funnel, wherein water can be poured through the funnel and into the water discharge tube from either side of the handle supports of the outflow meter; a spring-loaded plunger for selectively sealing a discharge opening provided in the base, which plunger is fitted with a typically TEFLON (trademark)-coated neoprene ring and is substantially hindered from inadvertently slipping out of a discharge opening having minimal taper; and a pair of adaptors extending downwardly from the funnel into the water discharge tube at different levels and wired to the timer, one of which adaptors terminates near the top and the other near the bottom of the water discharge tube. A switch float is mounted on each adaptor and water is added to the water discharge tube until the water level in the tube is located above the level of both switch floats. By operation of the plunger, water flows from the water discharge tube through the discharge opening onto the supporting surface and when the water level falls below the upper switch float, operation of the timer is initiated. When the water level falls below the lower switch float, this action stops the timer. The period of time required for the water level in the water discharge tube to fall from the lowest level of the upper switch float to the lowest level of the lower switch float indicates the drainage characteristic of the surface.

SUMMARY OF THE INVENTION

These and other objects of the invention are provided in a new and improved, symmetrical outflow meter characterized by a transparent water containment and discharge tube which is vertically mounted in a circular base having a pair of handle supports extending upwardly from the base on respective sides of the tube, in substantially diametrically-spaced relationship to each other; a timer support which spans the upper ends of the handle supports; a handle which spans the handle supports beneath the timer support; and a funnel mounted between the handle supports above the water discharge tube and beneath the handle. An electronic timer and circuit are provided typically on the timer support and a spring-loaded plunger, mounted on the funnel and extending downwardly into the water discharge tube and fitted with a typically TEFLON (trademark)-coated neoprene ring, operates to selectively and reversibly seal a discharge opening in the base by hand pressure. In a most preferred embodiment, an upper adaptor having a vertically-displaceable switch float mounted thereon, extends downwardly into the interior of the water discharge tube and terminates near the top of the tube and a lower adaptor extends downwardly into the tube to a point near the bottom of the tube and includes a similar switch float mounted thereon. Both adaptors are wired to the timer. As water is poured through the funnel into the water discharge tube while the plunger is in the sealing position in the base against the spring bias and the water level rises to the level of the upper float, displacement of the floats upwardly on the adaptors, respectively, prevents operation of the electronic timer. Since the outflow meter has been placed with the bottom sealing ring on the surface to be measured, release of the plunger from the discharge opening in the base allows water to drain from the water discharge tube onto the surface. As the water level drops below the level of the upper float, downward movement of the upper float by gravity activates the timer and as the water level drops below the level of the lower float, downward movement of the lower float by gravity on the adaptor terminates operation of the timer. The time required for the water level to drop in the water discharge tube from the level of the upper switch float to the level of the lower switch float is proportional to the drainage characteristics of the surface upon which the outflow meter is placed.

BRIEF DESCRIPTION OF THE DRAWINGS

The invention will be better understood by reference to the accompanying drawings, wherein:

FIG. 6 is a front view of the outflow meter, filled with water and resting on a pavement surface in operating configuration;

FIG. 7 is a front view of the outflow meter illustrated in FIG. 6, more particularly illustrating drainage of water from the outflow meter in application of the outflow meter;

FIG. 8 is a sectional view of the outflow meter, taken along section lines 8—8 in FIG. 4; and FIG. 9 is a sectional view of the outflow meter, taken along section lines 9—9 in FIG. 4.

DESCRIPTION OF THE PREFERRED EMBODIMENTS

Figure 1:
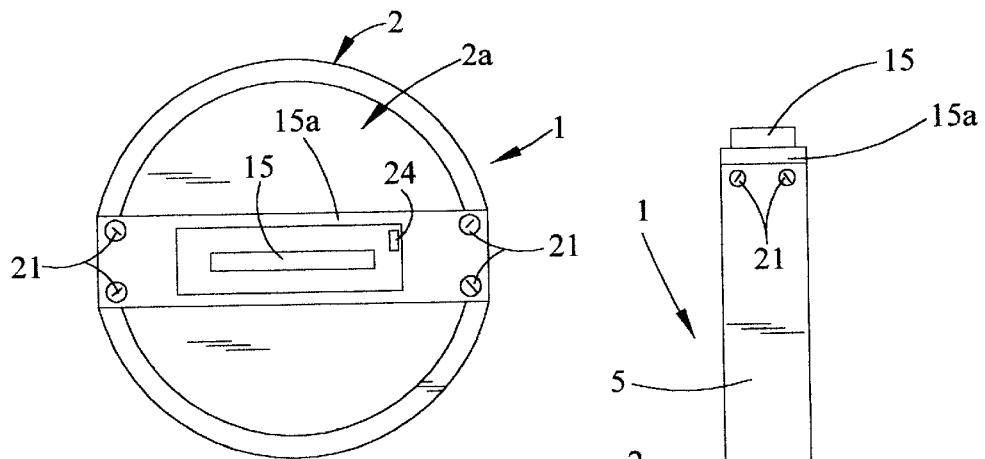
FIG. 1 is a top view of a preferred embodiment of the outflow meter of this invention.
Figure 2:
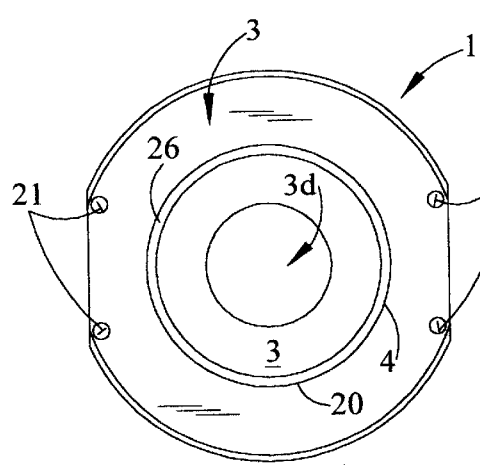
FIG. 2 is a bottom view of the outflow meter illustrated in FIG. 1.
Figure 3:
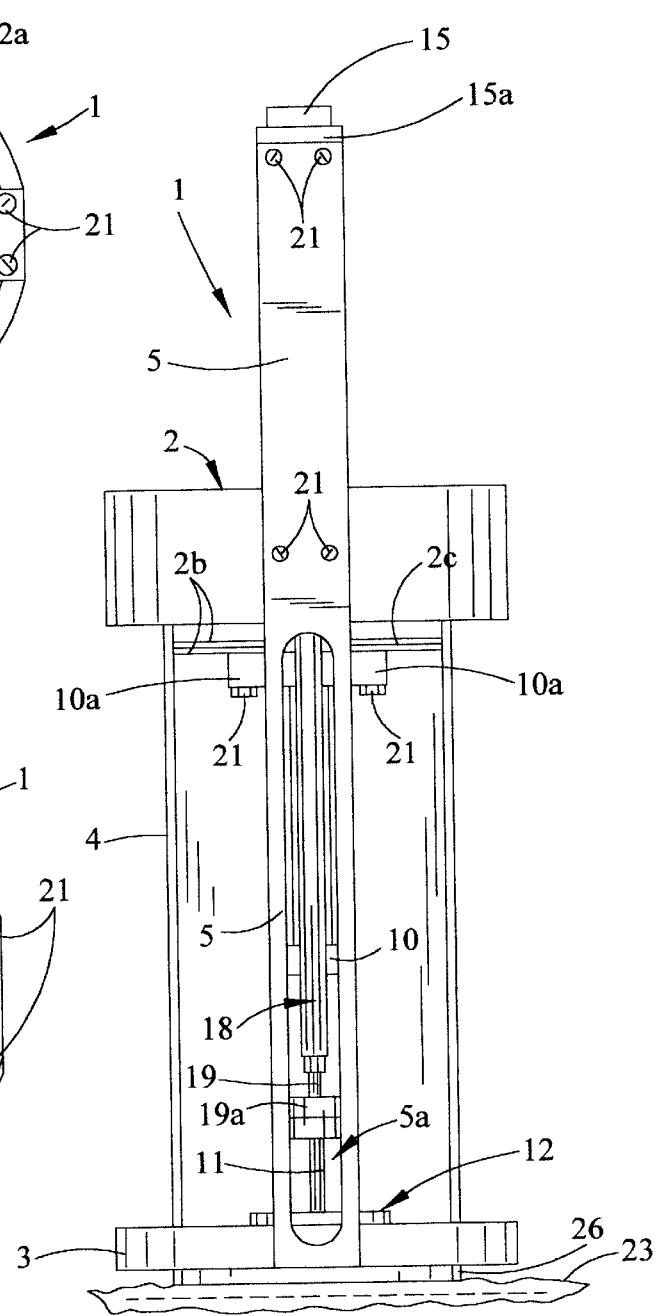
FIG. 3 is a left side view of the outflow meter illustrated in FIGS. 1 and 2, without water.

Referring initially to FIGS. 1–4, 8 and 9 of the drawings, in a preferred embodiment the symmetrically designed outflow meter of this invention is generally illustrated by reference numeral 1. The outflow meter 1, typically constructed of metal components unless otherwise noted, is characterized by an elongated, generally cylindrical, vertically-oriented, preferably transparent, typically glass or plastic water discharge tube 4, the lower end of which is mounted in a circular base 3. As illustrated in FIG. 8, the base 3 typically includes a tube seat 3a for receiving the water discharge tube 4, and an annular base flange 3b extends from the base side 3c of the base 3, and forms the bottom of the tube seat 3a. A central water discharge opening 3d, typically having about a 5-degree bevel on the top edge thereof, extends through the base flange 3b, and an o-ring 27, mounted in an o-ring groove (not illustrated) provided in the base side 3c, encircles the tube seat 3a in substantially concentric relationship to the water discharge opening 3d. The water discharge tube 4 is water-sealed against the base flange 3b and base side 3c of the base 3 by means of the o-ring 27. As particularly illustrated in FIGS. 3 and 4, a pair of elongated handle supports 5 extends upwardly from the base 3, in substantially diametrically-spaced relationship with respect to each other and each of the handle supports 5 may be provided with an elongated frame slot 5a. As illustrated in FIG. 2, a pair of bolts 21 extends upwardly through the base 3 on each side of the water discharge opening 3d, and each pair of bolts 21 is threaded into the corresponding handle support 5, to secure the handle support 5 on the base 3. A rectangular timer support 15a spans the upper ends of the handle supports 5, with the timer support 15a mounted on the handle supports 5 by means of a pair of bolts 21 which extend through the timer support 15a at each end thereof, as illustrated in FIG. 1, and are threaded into the corresponding underlying handle support 5. An electronic timer 15 is mounted on the timer support 15a. A handle 6, typically having a curved grip surface 6a, as illustrated in FIG. 8, is mounted between the handle supports 5, beneath the timer support 15a, typically by means of a pair of bolts 21 which extend through each handle support 5 beneath the timer support 15a, as illustrated in FIG. 3, and are threaded into respective ends of the handle 6. A circular funnel 2, having a sloped funnel opening 2a, is mounted on the upper end of the water discharge tube 4, between the handle supports 5 and beneath the handle 6. As illustrated in FIG. 8, the bottom surface of the funnel 2 is typically fitted with a circular funnel base 2b, and an o-ring 27 is seated in an o-ring groove (not illustrated) provided circumferentially in the funnel base 2b. The funnel base 2b is inserted in the open upper end of the water discharge tube 4 and the o-ring 27, interposed between the funnel base 2b and water discharge tube 4, seals the funnel base 2b in the water discharge tube 4.

Figures 4, 5:
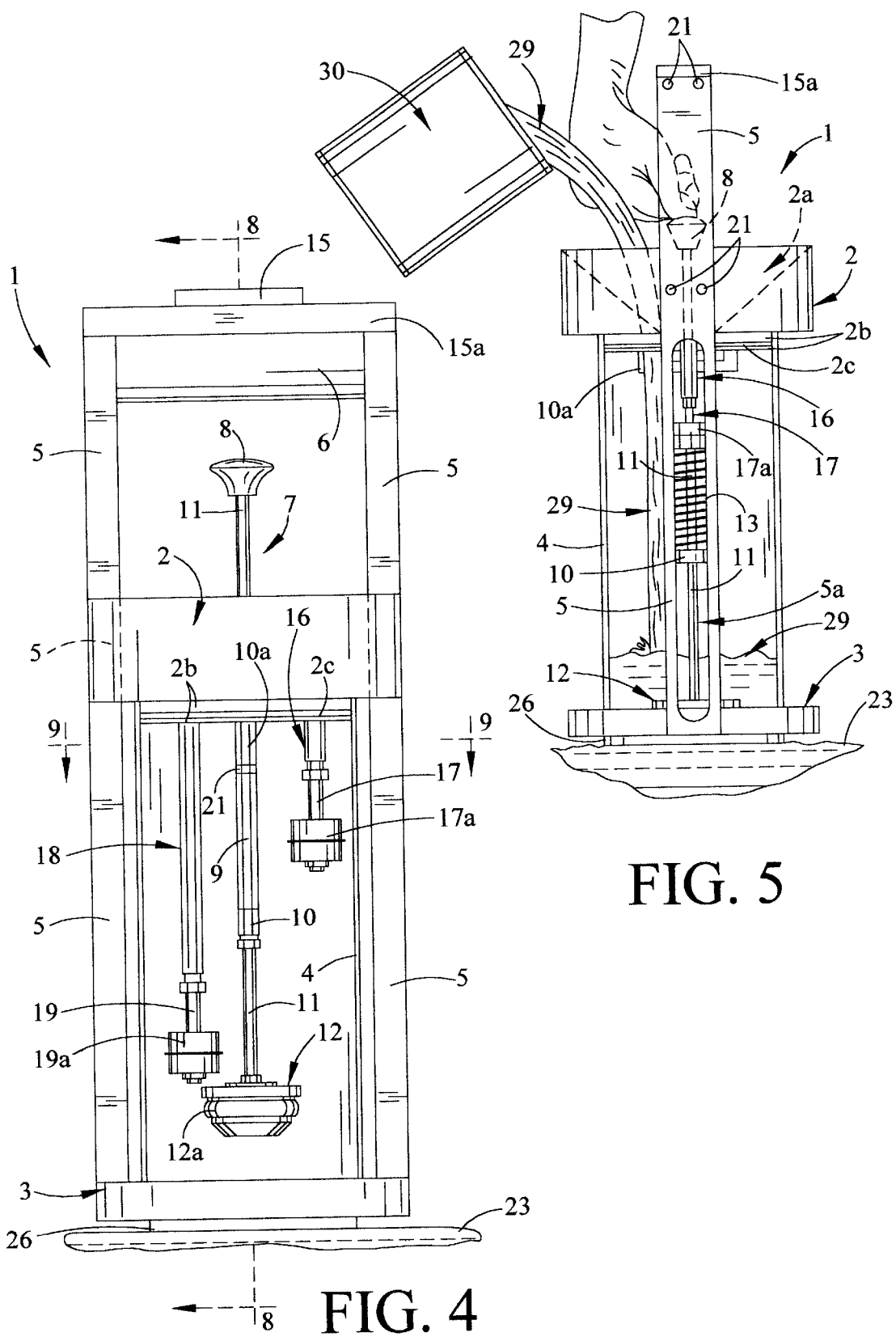
FIG. 4 is a front view of the empty outflow meter illustrated in FIG. 3.
FIG. 5 is a right side view of the outflow meter, illustrating pouring of water into the outflow meter in application of the outflow meter.

As further illustrated in FIG. 8, a plunger 7 includes a generally U-shaped plunger guide support 10a, secured to the bottom surface of the funnel base 2b by means of bolts 21. A plunger guide 10 horizontally spans the lower ends of a pair of elongated, vertical plunger supports 9 which extend downwardly from the plunger guide support 10a, in substantially parallel, spaced-apart relationship to each other, and the plunger guide 10 is secured on the plunger supports 9 by bolts 21. An elongated plunger rod 11, fitted on the upper end thereof with a plunger handle 8, extends downwardly through the funnel opening 2a of the funnel 2, typically through a bearing (not illustrated) provided in the plunger guide support 10a and through an aligned opening (not illustrated), provided in the plunger guide 10. A plunger stop collar 14 is mounted on the plunger rod 11 beneath the plunger guide support 10a by means of a set screw 22. A plunger return spring 13 is provided on the plunger rod 11 and is secured in place between the plunger stop collar 14 and the plunger guide 10, as illustrated in FIG. 8, typically by means of a pair of spring mount collars 13a, provided on the plunger rod 11. A plunger head 12, typically constructed of steel, is mounted on the bottom end of the plunger rod 11, and a neoprene ring 12a, typically coated with TEFLON (trademark), is seated in a circumferential ring groove (not illustrated) provided in the plunger head 12, for reversibly sealing the discharge opening 3d provided in the base 3, as hereinafter further described. As illustrated in FIG. 4, an elongated upper adaptor 16 extends downwardly from the funnel base 2b into the interior of the water discharge tube 4 and terminates near the upper end of the water discharge tube 4. In a most preferred embodiment of the invention an upper switch float 17a is vertically-slidably mounted on an upper float switch 17, mounted on the upper adaptor 16. An elongated lower adaptor 18 extends downwardly from the funnel base 2b into the interior of the water discharge tube 4, terminating near the bottom end of the water discharge tube 4, and includes a lower switch float 19a, vertically-slidably mounted on a lower float switch 19, provided on the end of the lower adaptor 18. The upper float switch 17 and lower float switch 19 are wired to the timer 15 (provided on the timer support 15a) in conventional manner, to activate and deactivate the upper float switch 17 and lower float switch 19, respectively. Alternatively, various contact switches which may be activated in sequence by the falling water level in the water discharge tube 4 may be used, according to the knowledge of those skilled in the art.

Referring next to FIGS. 5–7 of the drawings, the outflow meter 1 is used to measure the rate of water drainage on a typical surface 23, such as concrete or asphalt pavement, in the following manner. The outflow meter 1 is first placed on the pavement surface 23 with the sealing ring 26, provided on the bottom surface of the base 3, resting firmly on the surface 23 under test. The plunger head 12 of the plunger 7 is then inserted in the discharge opening 3d provided in the base 3, by firmly depressing the plunger handle 8 by hand, as illustrated in FIG. 5. Water 29 is then poured from a container 30 into the water discharge tube 4, through the funnel opening 2a of the funnel 2, until the water level rises above the upper float switch 17 and causes upper displacement of the lower switch float 19a and upper switch float 17a on the lower adaptor 18 and upper adaptor 16, respectively, as illustrated in FIG. 6. This position of the upper switch float 17a and lower switch float 19a opens the upper float switch 17 and lower float switch 19 and renders the timer 15 inoperable. The timer 15 is then activated by pressing a timer button 24 (FIG. 1) provided on the timer 15 and the plunger head 12 is removed from the discharge opening 3d with the help of the plunger return spring 13, by pulling upwardly on the plunger handle 8 of the plunger 7 The plunger return spring 13 serves to retain the plunger head 12 from the discharge opening 3d. This allows water to flow from the water discharge tube 4 through the discharge opening 3d and between the sealing ring 26 and surface 23. As the water level falls below the level of the upper float switch 17, the floating upper switch float 17a moves downwardly on the upper float switch 17 by gravity, and this closes the upper float switch 17 and causes the timer 15 to begin counting. As the water level falls below the level of the lower float switch 19, the floating lower switch float 19a likewise moves downwardly, displaced by gravity on the lower float switch 19 and this opens the lower float switch 19, to terminate operation of the timer 15. The time required for the water level to fall from the level of the upper float switch 17 to the level of the lower float switch 19 is indicated on the timer 15 and is proportional to the drainage characteristics of the surface 23 being tested.

Referring again to FIGS. 1 and 5–7 of the drawings, it will be appreciated by those skilled in the art that the outflow meter 1 of this invention is symmetrically designed and is therefore relatively stable while resting on a test surface 23 during use, since the handle 6, timer support 15a and timer 15 are located at substantially the center, rather than off-center, of the outflow meter 1. Accordingly, the center of gravity of the outflow meter 1 is located at substantially the center of the outflow meter 1 and this facilitates a more even compression of the sealing ring against the surface 23 and a more consistent timing characteristic during use. It will be further appreciated by those skilled in the art that the curvature of the funnel 2 extends 180 degrees on each side of the outflow meter 1, thus adding symmetry and providing sufficient of area of the funnel 2 for pouring the water 29 into the water discharge tube 4 and making it possible to pour the water 29 into the water discharge tube 4 on either side of the outflow meter 1. Furthermore, due to the TEFLON (trademark)-coated neoprene ring 12a on the plunger head 12 of the plunger 7, the plunger head 12 is a tight fit in the water discharge opening 3d of the base 3 and thus, has a strong tendency to remain in the water discharge opening 3d of the base 3 as the water 29 is poured into the funnel 2. This prevents the premature discharge of water 29 from the outflow meter 1 during use. While the base 3, handle supports 5, handle 6, timer support 15a and funnel 2 are preferably constructed of aluminum, stainless steel or other metal in order to ensure proper compression of the sealing ring 26 on the surface 23, it is understood that a variety of materials can be used in the construction of these components, and collar weights (not illustrated) can be mounted on the outflow meter 1, as desired, to facilitate adequate seating of the outflow meter 1 on the pavement surface 23.

While the preferred embodiments of the invention have been described above, it will be recognized and understood that various modifications can be made in the invention and the appended claims are intended to cover all such modifications which may fall within the spirit and scope of the invention.

Having described my invention with the particularity set forth above, what is claimed is:

1. An outflow meter for measuring water drainage from a surface, comprising a water discharge tube for containing water, said water discharge tube having an upper water-receiving end and a lower water discharge end; a base sealingly mounted in said discharge end of said water discharge tube for supporting said water discharge tube on the pavement, said base having a discharge opening for selectively discharging the water from said water discharge tube; a seal carried by said base for resting on the surface; a pair of handle supports extending upwardly from said base, in substantially diametrically-spaced relationship to each other on respective sides of said water discharge tube; a handle carried by said handle supports for carrying and positioning said outflow meter on the surface; a timer carried by said handle supports for measuring the time of discharge of said water from said water discharge tube; a plunger suspended in said water discharge tube for selectively sealing said discharge opening; a first switch provided in said water discharge tube and a second switch provided in said water discharge tube beneath said first switch, wherein operation of said first switch responsive to said discharging of the water starts said timer and operation of said second switch responsive to said discharging of the water stops said timer..

2. The outflow meter of claim 1 comprising a funnel carried by said handle supports above and centrally-mounted with respect to said water discharge tube for pouring the water into said water discharge tube.

3. The outflow meter of claim 1 comprising a bias mechanism provided on said plunger for biasing said plunger away from said discharge opening.

4. The outflow meter of claim 3 comprising a funnel carried by said handle supports above and centrally mounted with respect to said water discharge tube for pouring the water into said water discharge tube.

5. The outflow meter of claim 1 comprising a plunger guide extending into said water discharge tube for guiding said plunger into contact with said discharge opening.

6. The outflow meter of claim 5 comprising a funnel carried by said handle supports above said water discharge tube for pouring the water into said water discharge tube.

7. The outflow meter of claim 5 comprising a bias mechanism provided on said plunger for biasing said plunger away from said discharge opening.

8. The outflow meter of claim 7 comprising a funnel carried by said handle supports above said water discharge tube for pouring the water into said water discharge tube.

9. An outflow meter for resting on a test surface having surface voids and measuring the time of drainage of water through the surface voids, comprising a water discharge tube for containing water, said water discharge tube having an upper water-receiving end and a lower water discharge end; a base sealingly mounted in said discharge end of said water discharge tube for supporting said water discharge tube on the surface, said base having a discharge opening for selectively discharging the water from said water discharge tube; a seal carried by said base for resting on the surface; a pair of handle supports extending upwardly from said base, in substantially diametrically-spaced relationship to each other on respective sides of said water discharge tube; a handle carried by said handle supports for carrying and positioning said outflow meter on the pavement surface; a timer carried by said handle supports for measuring the time of discharge of said water from said water discharge tube; a circular funnel mounted between said handle supports above said water discharge tube; a plunger suspended in said discharge tube for selectively sealing said discharge opening; a first switch provided in said water discharge tube and a second switch provided in said water discharge tube beneath said first switch, wherein operation of said first switch responsive to said discharging of the water starts said timer and operation of said second switch responsive to said discharging of the water stops said timer.

10. The outflow meter of claim 9 comprising a bias mechanism provided on said plunger for biasing said plunger away from said discharge opening.

11. The outflow meter of claim 9 comprising a plunger guide extending from said funnel into said water discharge tube for guiding said plunger into contact with said discharge opening.

12. The outflow meter of claim 11 comprising a bias mechanism provided on said plunger for biasing said plunger away from said discharge opening.

13. The outflow meter of claim 9 comprising a timer support spanning the upper ends of said handle supports and wherein said timer is mounted on said timer support.

14. The outflow meter of claim 13 comprising a bias mechanism provided on said plunger for biasing said plunger away from said discharge opening.

15. The outflow meter of claim 13 comprising a plunger guide extending from said funnel into said water discharge tube for guiding said plunger into contact with said discharge opening.

16. The outflow meter of claim 15 comprising a bias mechanism provided on said plunger for biasing said plunger away from said discharge opening.

17. A concentrically balanced outflow meter for resting on a surface having surface voids and measuring the water drainage rate of the surface voids, comprising a water discharge tube for containing water, said water discharge tube having an upper water-receiving end and a lower water discharge end; a base sealingly mounted in and centrally positioned in said discharge end of said water discharge tube for supporting said water discharge tube on the surface, said base having a discharge opening for selectively discharging the water from said water discharge tube; a seal centrally mounted on said base for resting on the surface; a pair of handle supports extending upwardly from said base in substantially diametrically spaced-apart relationship with respect to each other on respective sides of said water discharge tube, said handle supports symmetrically-oriented with respect to said discharge tube; a handle carried by said handle supports for carrying and positioning said outflow meter on the surface; a timer carried by said handle supports for measuring the time of discharge of said water from said water discharge tube; a plunger centrally suspended in said discharge tube for selectively sealing said discharge opening, said plunger comprising a plunger rod, a plunger head terminating said plunger rod and a TEFLON (trademark)-coated neoprene ring fitted on said plunger head for reversibly sealing said discharge opening; and a first switch provided in said water discharge tube and a second switch provided in said water discharge tube beneath said first switch, wherein said outflow meter is substantially symmetrical and operation of said first switch responsive to said discharging of the water starts said timer and operation of said second switch responsive to said discharging of the water stops said timer.

18. The outflow meter of claim 17 comprising a circular funnel carried by said handle supports above said water discharge tube for pouring the water into said water discharge tube.

19. The outflow meter of claim 17 comprising a bias mechanism provided on said plunger for biasing said plunger head away from said discharge opening.

20. The outflow meter of claim 19 comprising a circular funnel carried by said handle supports above said water discharge tube for pouring the water into said water discharge tube.

\* \* \* \* \*